J. F. CHRISTIAN.
Buttons.

No. 211,702.  Patented Jan. 28, 1879.

WITNESSES:
Francis McArdle
C. Sedgwick

INVENTOR:
J. F. Christian
BY Munn & Co
ATTORNEYS.

UNITED STATES PATENT OFFICE.

JOHANN F. CHRISTIAN, OF NÜRNBERG, GERMANY, ASSIGNOR TO COMMANDITE-GESELLSCHAFT G. NEIFF & COMPANY, OF SAME PLACE.

IMPROVEMENT IN BUTTONS.

Specification forming part of Letters Patent No. 211,702, dated January 28, 1879; application filed October 15, 1878.

*To all whom it may concern:*

Be it known that I, JOHANN FRIEDRICH CHRISTIAN, of Nürnberg, in Germany, have invented a new and Improved Button, of which the following is a specification:

My invention consists of a button having the head of a separate piece from the shank, the two parts being constructed so that they may be readily connected together or detached, thereby facilitating attachment of the button to a garment.

The shank is formed with shoulders that pass through a slot in the head, and when the head is turned slightly retains the head upon the shank.

A spring around the shank forces the shoulders into a cross-groove in the face of the button, and retains the parts in place.

Figure 1:
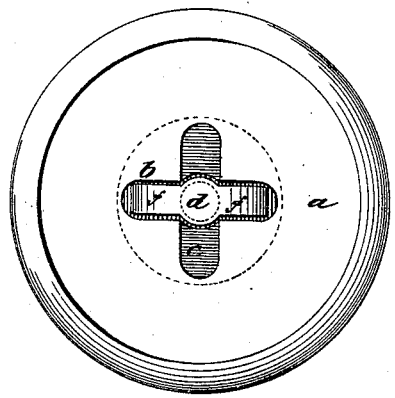
Figure 2:
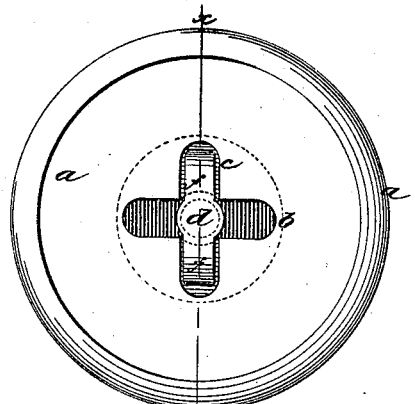
Figure 3:
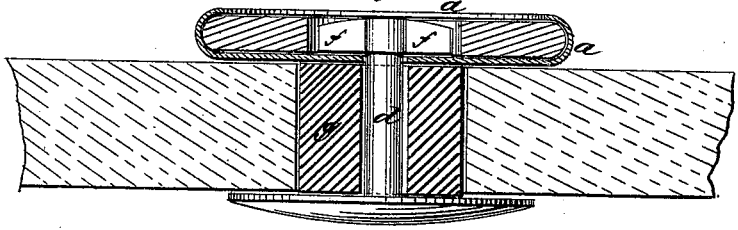

In the accompanying drawings, Figure 1 is a face view of my improved button, showing the shank inserted through the slot. Fig. 2 shows the shoulders of the shank turned into the grooves of the head. Fig. 3 is a section on the line $x$ $x$ of Fig. 2.

Similar letters of reference indicate corresponding parts.

The head $a$ of the button may be a solid piece of material or an ornamental disk attached to a metal plate, as shown in the drawings. This head $a$ has a cross-slot, $b$, at its center, passing entirely through the head. It is also provided with a groove, $c$, in its face, at right angles to slot $b$, and of suitable depth.

$d$ is the shank, rigidly connected with bottom piece $e$, and having at its upper end shoulders $f f$, forming a T on the end of the shank. $g$ is a spring, of rubber or of any suitable material or character, upon the shank $d$.

To secure the parts together the shank $d$ is inserted in slot $b$ from the back of the head $a$, and the spring $g$ compressed to permit shoulders $f$ to come above the face of the head; then by a quarter-turn of the head or the shank the shoulders $f$ will be caused to coincide with the groove $c$, into which they are drawn by spring $g$, and the parts will be locked. To disconnect the parts, the operation will be reversed.

Figure 4:
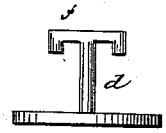
Figure 5:
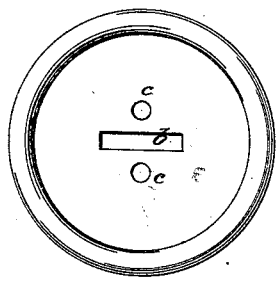

A single shoulder, $f$, may be used instead of two, if desired; and the T upon the shank can be made, as shown in Fig. 4, with downward projections, that will enter holes $c$ $c$ in the face of the head. (See Fig. 5.)

Figure 6:
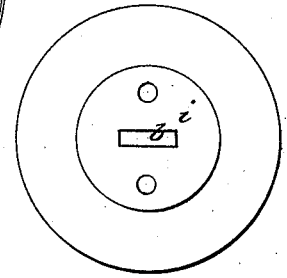

It will also be understood that this invention may be used in connection with buttons that have a smooth face. The shank in that case will be connected to the plate $i$, that is attached to the back of head $a$ by rivets. (See Fig. 6.)

Figure 7:
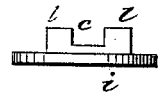

$b$ is the slot for the shoulders $f$ to pass through. $l$ $l$ are flanges at the inner edge of slot $b$, having grooves $c$ $c$, (see Fig. 7,) in which shoulders $f$ may be secured by a quarter-turn, as before described.

With either form of head $a$ the arrangement may be reversed, and the head made to fit into the shank instead of the shank entering the head.

Having thus described my invention, I claim as new and desire to secure by Letters Patent—

A button consisting of the one-piece flat disk $a$, slotted and grooved, as shown, the bottom $e$, connected therewith by a T-shank, $d$ $f$, and the rubber spring $g$, arranged as shown and described, for the purpose specified.

In testimony that I claim the foregoing I have hereunto set my hand this 12th day of August, 1878.

JOHANN FRIEDRICH CHRISTIAN.

Witnesses:
    FRANZ HASSLACHER,
    JOSEPH PATRICK.